United States Patent
Gerez et al.

(10) Patent No.: US 9,341,116 B2
(45) Date of Patent: May 17, 2016

(54) GAS TURBINE ENGINE COMPRISING MEANS FOR AXIALLY RETAINING A FAN OF THE ENGINE

(75) Inventors: Valerio Gerez, Yerres (FR); Wouter Balk, Melun (FR); Edouard Joseph Jadczak, Le Mee sur Seine (FR)

(73) Assignee: SNECMA, Paris (FR)

( * ) Notice: Subject to any disclaimer, the term of this patent is extended or adjusted under 35 U.S.C. 154(b) by 506 days.

(21) Appl. No.: 13/823,474

(22) PCT Filed: Sep. 27, 2011

(86) PCT No.: PCT/FR2011/052242
§ 371 (c)(1),
(2), (4) Date: Mar. 14, 2013

(87) PCT Pub. No.: WO2012/042161
PCT Pub. Date: Apr. 5, 2012

(65) Prior Publication Data
US 2013/0186056 A1 Jul. 25, 2013

(30) Foreign Application Priority Data
Sep. 28, 2010 (FR) .................................... 10 57814

(51) Int. Cl.
*F01D 21/00* (2006.01)
*F02C 7/00* (2006.01)
*F01D 21/04* (2006.01)

(52) U.S. Cl.
CPC . *F02C 7/00* (2013.01); *F01D 21/04* (2013.01); *F01D 21/045* (2013.01); *Y02T 50/671* (2013.01)

(58) Field of Classification Search
CPC ........ F01D 21/045; F01D 21/00; F01D 21/04
USPC .............................................. 60/39.091; 415/9
See application file for complete search history.

(56) References Cited

U.S. PATENT DOCUMENTS

| 5,123,508 | A | * | 6/1992 | Pedersen ..................... 192/18 A |
| 6,179,551 | B1 | | 1/2001 | Sathianathan et al. |
| 6,312,215 | B1 | * | 11/2001 | Walker ................................ 415/9 |
| 2005/0276683 | A1 | | 12/2005 | Lapergue et al. |

FOREIGN PATENT DOCUMENTS

| EP | 0 965 731 | 12/1999 |
| EP | 1 605 139 | 12/2005 |
| FR | 2 752 024 | 2/1998 |
| FR | 2 888 621 | 1/2007 |

OTHER PUBLICATIONS

International Search Report Issued Jan. 31, 2012 in PCT/FR11/52242 Filed Sep. 27, 2011.

* cited by examiner

*Primary Examiner* — Kenneth Bomberg
*Assistant Examiner* — Anthony Ayala Delgado
(74) *Attorney, Agent, or Firm* — Oblon, McClelland, Maier & Neustadt, L.L.P.

(57) ABSTRACT

A gas turbine engine including: a casing in which is mounted at least one shaft for driving a fan solidly connected to a driving drum including blades to compress an airflow moving from upstream to downstream in the engine; and an axial retention mechanism, on standby, solidly connected to the casing and arranged to come into contact with the driving drum such as to prevent axial movement of the drum in event of breakage of the driving shaft.

14 Claims, 7 Drawing Sheets

GAS TURBINE ENGINE COMPRISING MEANS FOR AXIALLY RETAINING A FAN OF THE ENGINE

BACKGROUND OF THE INVENTION

1. Field of the Invention

The field of the invention is that of gas turboshaft engines for aircrafts. The invention relates more particularly to a system for retaining a fan of a turboshaft engine in the event of breakage of a driving shaft of the fan.

2. Description of the Related Art

In an emergency situation, it is necessary to protect the engine so that the aircraft can be diverted towards the closest airport. In the event of partial or total loss of a fan blade, the fan goes unbalanced and oscillates. This phenomenon is known to the person skilled in the art under the designation "fan imbalance" (orbitage de la soufflante in French). These oscillations generate important stresses which can cause collateral damage. To ensure safety and avoid such damage, it is necessary to take these stresses into account when sizing the structures of the engine and airplane, which makes the engine heavier than a standard engine which would be designed to bear stresses during normal flights only. To limit the dynamic loads in the fan and relieve the engine, a decoupling device which makes it possible to limit the stresses at high RPM is known from patent application FR 2 877 046 by SNECMA company. In practice, in a twin-shaft turboshaft engine comprising a low-pressure shaft and a high-pressure shaft, the decoupling system is arranged so as to decouple the bearings that bear the low-pressure shaft for driving the fan with respect to the fan frame, these bearings being known to the person skilled in the art under the designation "bearing 1" and "bearing 2".

After the fan is decoupled, the modal situation of the engine is described as "hypercritical", the only mode of operation of the engine is then low RPM. In an advantageous way, the dynamic loads in the fixed structures are then very much reduced at high RPM. At high RPM, the dynamic loads in the shaft remain important and the risk of breakage of the low-pressure driving shaft increases.

In reference to FIG. 1, a twin-shaft engine 1 has a low-pressure shaft 2 solidly connected to a fan 4 and a high-pressure shaft 3 which rotate around an axis X of the engine. Thereafter, the "upstream" and "downstream" terms are defined with reference to the movement of the gases in the engine, the gases moving from upstream to downstream. Similarly, in the present application, the terms "inner" and "outer" are conventionally defined radially with reference to the axis X of the engine shown in FIG. 1. So, a cylinder extending according to the axis of the engine has an inner surface facing the axis of the engine and an outer surface opposite to its inner surface.

Still in reference to FIG. 1, the low-pressure shaft 2 is rotatively guided in a fan frame 5 of the engine 1 by means of bearings P1, P2 known to the person skilled in the art under the designation "bearing 1" and "bearing 2" respectively. In reference to FIG. 1, the fan frame 5 has an outer casing 57 and an inner hub 58 connected by means of structural struts 59. The high-pressure shaft 3 is rotatively guided in the fan frame 5 of the engine 1 by means of a bearing P3 known to the person skilled in the art under the designation "bearing 3". As shown in FIG. 1, the engine 1 includes a forward fairing 15, also called "splitter", solidly connected to the hub 58 of the fan frame 5 and arranged to guide, internally, a core-engine flow and, externally, a fan flow. Besides, the engine 1 has a low-pressure compressor, known to the person skilled in the art under its English designation "booster", which has stator blades 62 solidly connected to the forward fairing 15 and mobile blades 61 solidly connected to a driving drum 6 in order to compress the core-engine flow moving from upstream to downstream in the engine 1. A decoupling device 10 is arranged between the hub 58 of the fan frame 5 and the bearings P1, P2 so as to make the structure of the engine more flexible in the hypercritical mode as explained previously.

In the event of breakage of the low-pressure shaft 2 downstream from the bearing P2, there is a catching device 20, known under its English designation "catcher", which makes it possible to axially retain the upstream part of the low-pressure shaft 2 solidly connected to the fan 4. This catcher 20 includes on the one hand a ring 21 extending radially inwards from the hub 58 of the fan frame 5 and on the other hand an annular rim 22 extending radially outwards from the low-pressure shaft 2. So, in the event of breakage of the low-pressure shaft 2 downstream from the bearing P2, the part of the low-pressure shaft 2 which is situated upstream from the zone of breakage moves upstreamwards so that the annular rim 22 comes into contact with the ring 21 and retains it axially. In other words, the upstream part of the low-pressure shaft 2 is "caught" by the catcher 20 in the event of breakage of the low-pressure shaft 2.

Such a catcher 20 is satisfactory in the event of breakage of the low-pressure shaft 2 downstream from the bearing P2 but is ineffective in the event of breakage upstream from the said bearing P2. So, the stator blades 62 are not capable of retaining the mobile blades 61 of the drum 6 in the event of breakage of the low-pressure shaft 2.

BRIEF SUMMARY OF THE INVENTION

In order to eliminate at least some of the previously mentioned drawbacks, the invention relates to a gas turbine engine including a casing in which there is at least one mounted shaft for driving a fan solidly connected to a driving drum provided with blades in order to compress an airflow moving from upstream to downstream in the engine, the engine including axial retention means, on standby, solidly connected to the casing and arranged to come into contact with the driving drum so as to prevent the axial movement of the said drum in the event of breakage of the driving shaft.

Thanks to the invention, the driving shaft is retained axially, in an indirect way, via the driving drum solidly connected to the fan. The retention means make it possible to catch the "drum—fan—low-pressure shaft" assembly in a reliable way wherever the breakage of driving shaft has occurred. So, even if the shaft breaks in the close proximity of the fan, the fan is not ejected upstreamwards, on the contrary it is retained by the drum. The drawbacks of the previous art are thus eliminated.

In an advantageous way, the shape of the drum takes part in the axial retention and it is not necessary to add specific means to the drum to achieve the function of retention.

Preferably, the driving drum has stop means arranged so as to come into contact with the axial retention means, the stop means being formed by a downstream part of the driving drum, preferably its downstream end. This makes it advantageously possible to retain the drum near the engine casing, the bulk of the retention means being thus limited. Preferentially, the stop means extend radially towards the inside of the engine.

By nature, the downstream end of the drum is thickened or reinforced so that it resists to the centrifugal efforts undergone by the drum in rotation. This downstream end of the drum is thus appropriate to form stop means because of its rigidity and resistance to deformations.

According to a preferred aspect of the invention, the axial retention means, on standby, extend into the drum. In an advantageous way, the stop means are used, i.e. activated to perform the retaining function, only when the drum moves axially. It is thus not necessary to provide a complex device to put the retention means on standby.

Preferably, the driving drum having a radially convex part, the axial retention means, on standby, face the convex part. In a very advantageous way, the shape of the driving drum makes it possible to put the retention means on standby during normal conditions of use, the retention means being placed in the convex part of the drum. The shape of the driving drum makes it possible to activate the retention means in case of hypercritical operation, the retention means coming into contact with the downstream end of the drum. In the event of breakage of the shaft, the drum moves axially. The axial retention means are then facing a downstream part of the drum and come into contact with the latter. The convex shape makes it advantageously possible to absorb the axial shock.

According to an aspect of the invention, the axial retention means include at least one retention dog longitudinally aligned with a downstream part of the driving drum so as to prevent the axial movement of the said drum in the event of breakage of the driving shaft. Preferably, the retention dog extends radially towards the outside of the engine.

According to another aspect of the invention, the axial retention means have an abradable coating intended to come into contact with the driving drum. Preferably, the abradable coating is arranged on the downstream surface and/or the upper surface of the retention dog so as to absorb an axial and/or radial shock.

Preferably, the retention dog is articulated with respect to the casing so as to define:
- a mounting position in which the retention dog is radially shifted with respect to the driving drum so as to enable an axial movement of the said drum, and
- a working position in which the retention dog is longitudinally aligned with the driving drum so as to prevent the axial movement of the said drum in the event of breakage of the driving shaft.

In an advantageous way, an articulated retention dog makes it possible to enable an axial movement of the driving drum during the mounting while preventing it in operation. Preferentially, the articulated retention dog is mounted so that it can swivel with respect to the casing. So, in the mounting position, the radial bulk of the retention dog is reduced in comparison with its working position.

According to a particular embodiment of the invention, the retention means comprising a crenellated annular retention ring extending radially outwards and having retention dogs separated by retention openings, the driving drum comprising a crenellated annular stop ring extending radially inwards and having stop teeth separated by stop openings, the stop teeth are arranged to come into contact with the retention dogs so as to prevent the axial movement of the said drum in the event of breakage of the driving shaft.

In an advantageous way, the mounting of the drum is easier when the crenellations of the retention means cooperate with those of the stop means so as to enable an axial movement of the drum.

Still preferably, at least one retention dog is inclined with reference to an axial plane crossing the said dog. In other words, the upstream part of the dog is angularly shifted with respect to its downstream part.

Still preferably, at least one stop tooth is inclined with reference to an axial plane crossing the said tooth. In an advantageous way, an inclined dog and/or tooth prevents an axial movement of the drum, only an oblique translation being enabled.

According to an aspect, at least one retention dog is inclined according to the same orientation as at least one inclined tooth. Due to their same orientations, the retention dog can cooperate with the openings of the drum crenellations at the time of the assembling.

Preferably, the driving shaft of the fan being arranged to be rotatively driven during its operation according to a first direction of rotation, the drum is arranged to be mounted downstreamwards into the engine while rotating the drum in the same direction of rotation as the first operational direction of rotation of the shaft. In the event of breakage of the shaft downstream from the fan, the drum moves upstreamwards while revolving according to the first direction of rotation, which makes it impossible for a retention dog to cooperate with the openings of the drum crenellations. In other words, the inclination of the stop tooth and retention dog is defined with reference to the direction of rotation of the shaft in order to prevent any lack of retention in the event of breakage of the shaft.

Preferentially, the shaft for driving the fan is arranged to be rotatively driven in the clockwise direction, when seen from behind.

BRIEF DESCRIPTION OF THE SEVERAL VIEWS OF THE DRAWINGS

The invention will be better understood by means of the following non-restrictive description of preferred embodiments of the invention, in reference to the accompanying drawing wherein.

DETAILED DESCRIPTION OF THE INVENTION

Figure 2:
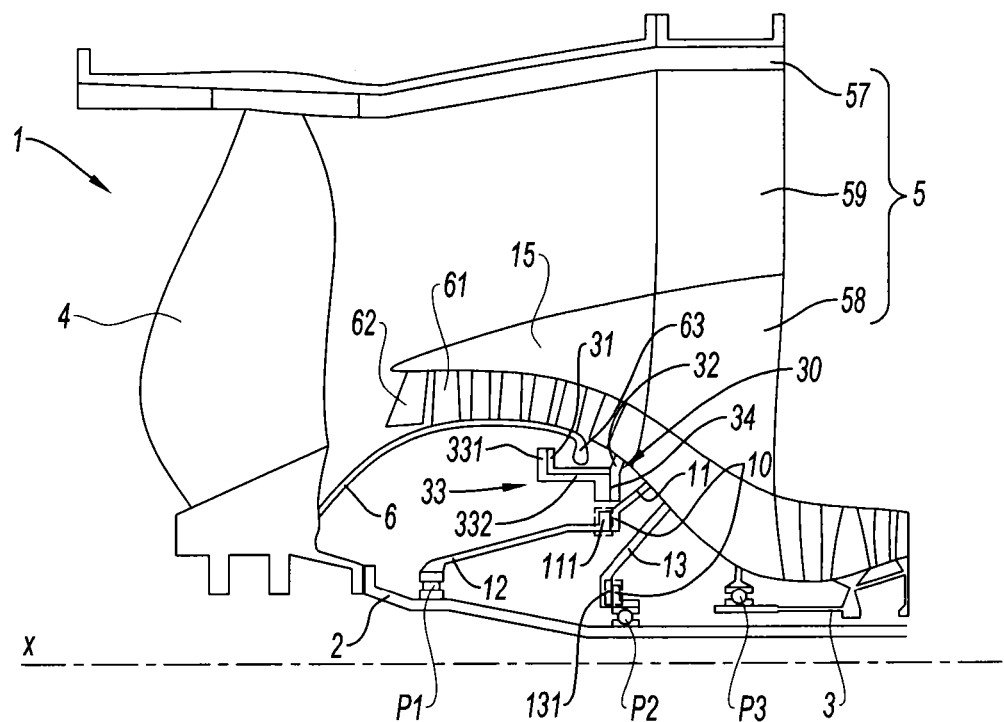
FIG. 2 is a schematic representation, in axial section, of an engine with a fan having means for axially retaining the fan according to a first embodiment of the invention.
Figure 4:
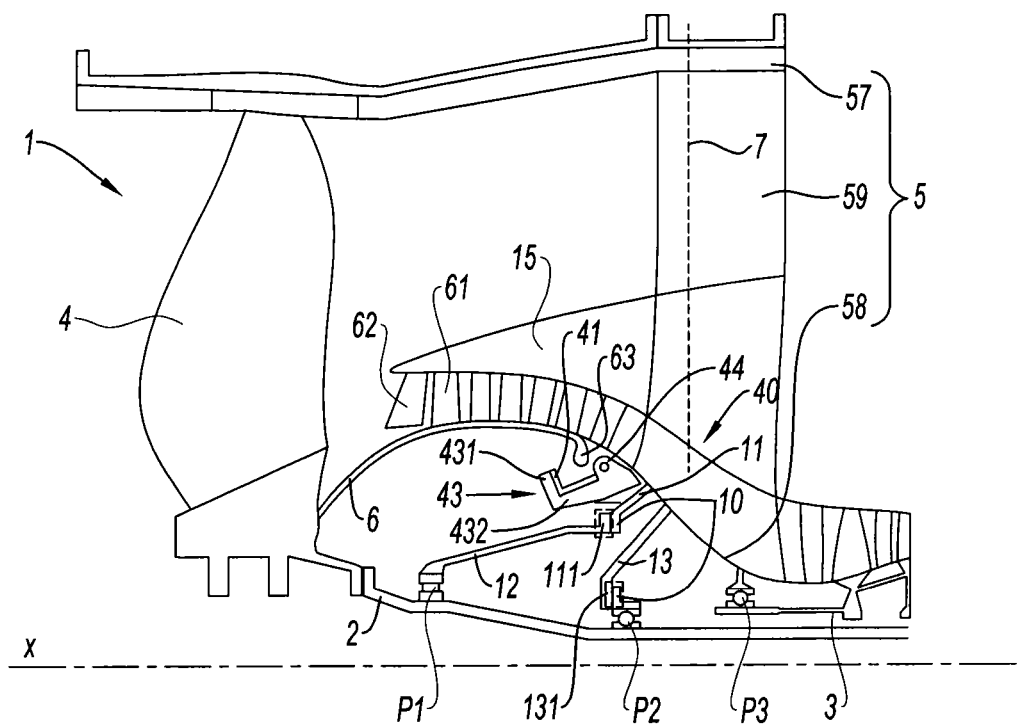
FIG. 4 is an schematic representation, in axial section, of an engine with a fan having means for axially retaining the fan according to a second embodiment of the invention, wherein the retention means are in the mounting position.
Figure 6:
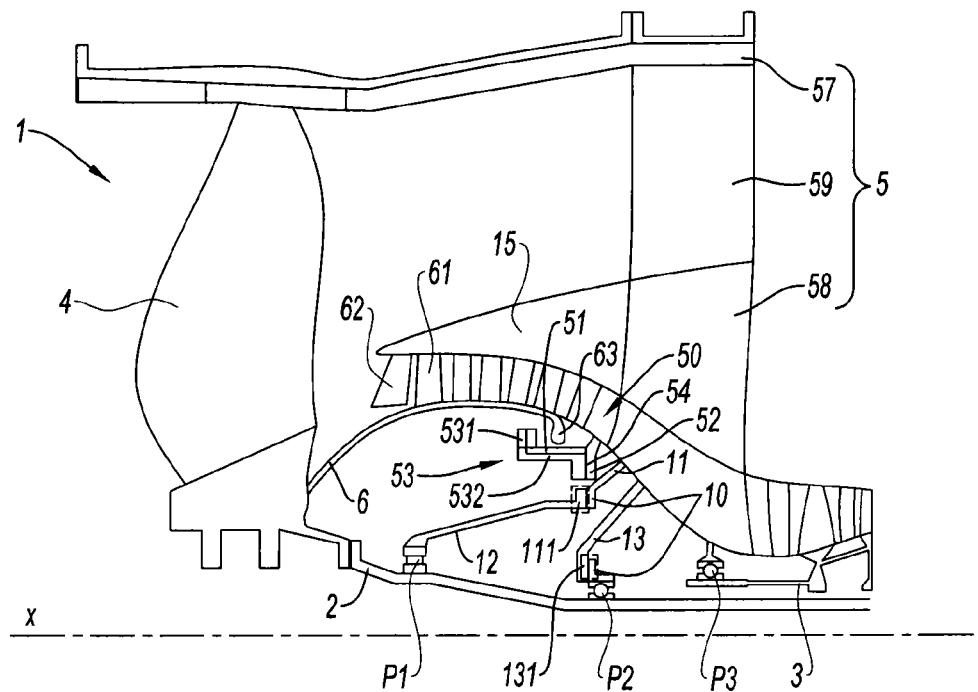
FIG. 6 is a schematic representation, in axial section, of an engine with a fan having means for axially retaining the fan according to a third embodiment of the invention.

In reference to FIGS. 2, 4 and 6, a twin-shaft engine 1 has a low-pressure shaft 2 solidly connected to a fan 4 and a high-pressure shaft 3 which are driven around an axis X of the engine 1, the low-pressure shaft 2 being rotatively guided in a fan frame 5 of the engine 1 by means of bearings P1, P2 known to the person skilled in the art under the designation "bearing 1" and "bearing 2" respectively. The fan frame 5 has an outer casing 57 and an inner hub 58 connected by means of structural struts 59. The high-pressure shaft 3 is rotatively guided in the fan frame 5 of the engine 1 by means of a bearing P3 known to the person skilled in the art under the designation "bearing 3". The engine is a double-flow-type engine and has a forward fairing 15, solidly connected to the hub 58 of the fan frame 5, arranged so as to guide internally a core-engine flow and externally a fan flow.

Thereafter, the "upstream" and "downstream" terms are defined with reference to the movement of the gases in the engine, the gases moving from upstream to downstream. Similarly, in the present application, the terms "inner" and "outer" are conventionally defined radially with reference to the axis X of the engine shown in FIGS. 2, 4 and 6. So, a cylinder extending according to the axis of the engine has an inner surface facing the axis of the engine and an outer surface, opposite to its inner surface.

Besides, the engine 1 has a low-pressure compressor, known to the person skilled in the art under its English designation "booster", which has stator blades 62 solidly connected to the forward fairing 15 and mobile blades 61 solidly connected to a driving drum 6 in order to compress a core-engine airflow moving from upstream to downstream in the engine 1. The driving drum 6 is solidly connected to the low-pressure shaft 2 of the engine 1 in order to enable the driving of the mobile blades 61.

Similarly to an engine of the previous art, the engine 1 has a decoupling device 10 arranged between the forward fairing 15, which is solidly connected to the fan frame 5, and the bearings P1, P2 in order to make the structure of the engine more flexible in the hypercritical mode as explained previously.

In reference to FIGS. 2, 4 and 6, the decoupling device 10 comprises a primary part arranged to decouple the first bearing P1 and a secondary part to decouple the second bearing P2. The primary part has a primary interface element 12, of cylindrical shape, substantially opening out downstreamwards, and which is connected, on the one hand, with the first bearing P1 and, on the other hand, with a primary annular ring 11 extending radially from the hub 58 of the fan frame 5 towards the inside of the engine 1. The primary annular ring 11 is connected with the primary interface element 12 by means of a primary divisible connection 111 arranged so as to break in case of incident. The secondary part, as to it, has a secondary interface element 13, of cylindrical shape, substantially opening out downstreamwards, and which is connected, on the one hand, with the second bearing P2 and, on the other hand, with the hub 58 of the fan frame 5. The secondary interface element 13 is connected with the second bearing P2 by means of a secondary divisible connection 131 arranged to break in case of incident. So, in case of excessive load, the primary interface element 12 separates from the primary annular ring 11 and the secondary interface element 13 separates from the second bearing P2. Bearing P1, P2 are thus decoupled.

According to the invention, the engine 1 includes axial retention means, on standby, solidly connected to the casing 5 of the engine which are arranged to come into contact with the driving drum 6 so as to retain it axially in the event of breakage of the low-pressure shaft 2. In reference to FIGS. 2, 4 and 6, the retention means 30, 40, 50 are solidly connected to the hub 58 of the fan frame 5 so as to be able to catch the low-pressure driving shaft 2 in an indirect way via the driving drum 6.

Unlike the previous art in which the low-pressure shaft 2 is directly caught via a catcher which is solidly connected to the low-pressure shaft 2, the retention means 30, 40, 50 according to the invention are arranged to come into contact with the driving drum so as to retain it axially in the event of breakage of the driving shaft. In other words, the axial retention of the low-pressure shaft 2 is indirect. The retention means 30, 40, 50 make it possible to retain the low-pressure shaft 2 wherever the breakage has occurred. So, even if the low-pressure shaft 2 breaks in the close proximity of the fan 4, the latter is axially retained via the driving drum 6.

In reference to FIGS. 2, 4 and 6, the invention is set out within the framework of a driving drum 6 extending axially according to the axis X of the engine 1 and having a generally cylindrical shape. The driving drum 6 opens out downstreamwards and has an upstream end solidly connected to the fan 4 and a downstream end 63 extending radially inwards. In other words, the driving drum 6 is radially convex in its median part so as to enable the retention means 30, 40, 50 to extend when the latter are on standby. The convex part makes it advantageously possible to absorb the shock during the axial movement as it is explained in detail thereafter.

In this instance, the driving drum 6 has stop means, for bumping against the retention means 30, 40, 50, which are arranged to retain the low-pressure shaft 2 of the engine 1. In this example, the downstream end 63 of the driving drum 6 is arranged so as to come and bump against the retention means 30, 40, 50 but it is obvious that the driving drum 6 could include other stop means extending, for example, from the convex part of the driving drum 6.

Figure 1:
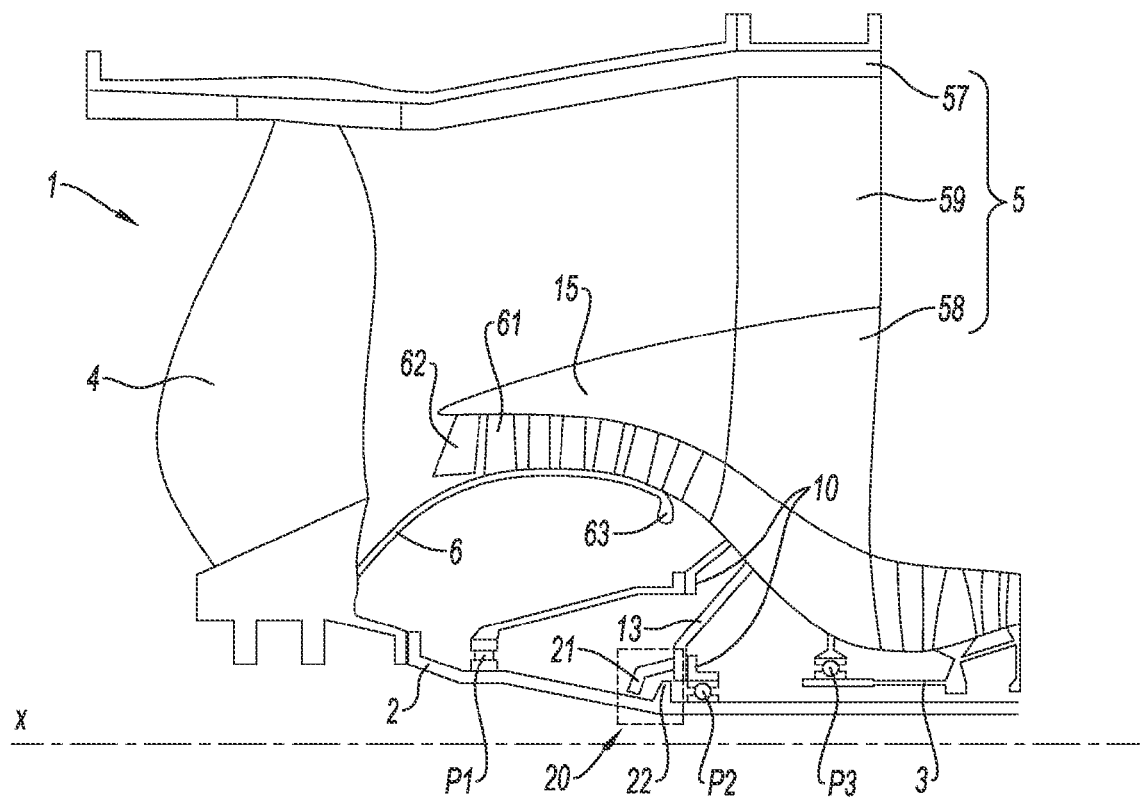
FIG. 1 is a schematic representation, in axial section, of an engine according to the previous art (already discussed)

As shown for example in FIG. 1, the downstream end 63 of the driving drum 6 is thicker than its convex part and extends radially inwards in order to resist the centrifugal stresses undergone by the drum during its rotation. The downstream end 63 of the driving drum 6 is by nature sufficiently resistant to form the stop means. In other words, advantage has been taken of the shape and characteristics of the drum to form an effective, low-bulk axial retention system without modifying said drum 6.

Preferentially, the axial retention means 30, 40, 50, on standby, extend into the driving drum 6 and face its convex part. So, as shown in FIGS. 2, 4 and 6, the retention means 30, 40, 50, in standby position, do not hinder the rotation of the low-pressure drum 6. The retention means 30, 40, 50 are activated only at breakage of the low-pressure shaft 2, the driving drum 6 moving then upstreamwards so that its downstream end 63 comes into contact with the retention means 30, 40, 50 as it is explained in detail thereafter.

According to an aspect of the invention, the retention means 30, 40, 50 include an abradable coating 31, 41, 51 arranged to absorb both a radial shock in case of loss of a fan blade 4 and an axial shock in the event of breakage of the low-pressure shaft 2. Preferably, the abradable coating 31, 41, 51 is applied to the downstream surface and/or upper surface of the said retention means.

By way of illustration, the retention means are going to be explained thereafter within the framework of three preferred embodiments of the engine.

Figure 3A:
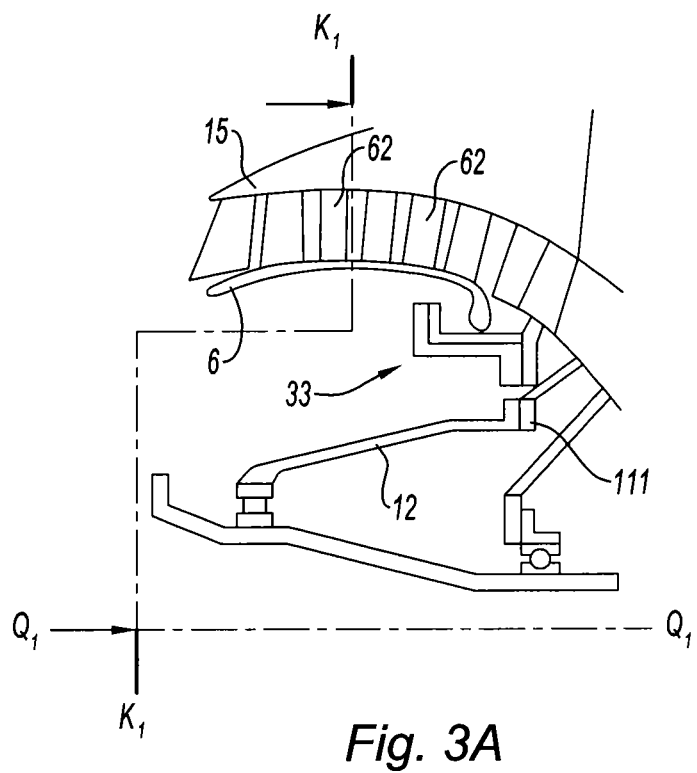
FIG. 3A is a closer view of FIG. 2, wherein section planes K1-K1 and Q1-Q1 are shown.
Figure 3B:
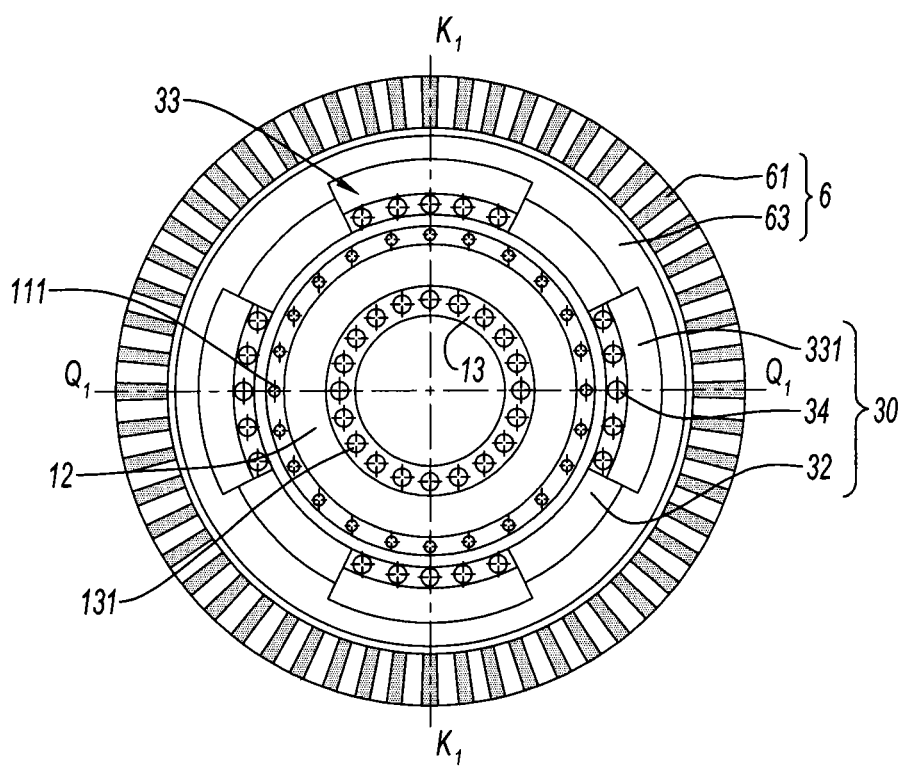
FIG. 3B is a schematic representation, seen from upstream from the retention means according to the first embodiment, according to section planes K1-K1 and Q1-Q1.

According to a first embodiment, in reference to FIGS. 2 and 3, the driving drum 6 has a downstream end 63 forming a solid annular rim 63 extending radially towards the inside of the engine 1. FIG. 3B shows the driving drum 6 with its decoupling device 10 and its retention means 30 seen from the front of the engine. The driving drum 6 has, at its periphery, mobile blades 61 extending radially outwards from its outer surface, the primary and secondary interface elements 12, 13 as well as the divisible connections 111, 131 of its decoupling device 10 being partially shown in FIG. 3B.

The retention means 30 according to this first embodiment of the invention have a solid annular ring 32 extending radially inwards from the forward fairing 15 and a plurality of retention dogs 33 which extend radially outwards and are solidly connected to the solid annular ring 32. As shown in FIG. 3B, four retention dogs 33 are angularly distributed on the solid annular ring 32 and include each a radial part 331 and a longitudinal part 332 forming a L the downstream end of the longitudinal part 332 of which is solidly connected to the solid annular ring 32 by means of a connection 34 which, in this instance, is bolted as shown in FIG. 2. In other words, the radial part 331 of the retention dog 33 which extends radially outwards is parallel to the solid annular ring 32 and shifted upstreamwards with respect to the latter.

The outer surface of the longitudinal part 332 and the downstream surface of the radial part 331 of the retention dog 33 are covered with an abradable coating 31 so as to absorb both an axial shock and a radial shock as explained in detail previously.

As shown in FIGS. 2 and 3, the outer end of the radial part 331 of the retention dog 33 is radially exterior to the downstream end 63 of the driving drum 6 so that, in the event of breakage of the low-pressure shaft 2 and axial movement of the driving drum 6 upstreamwards, the downstream end 63 of the driving drum 6 comes into contact with the radial part 331 of the retention dogs 33, thus preventing ejection of the drum 6 and its fan 4.

Figure 5A:
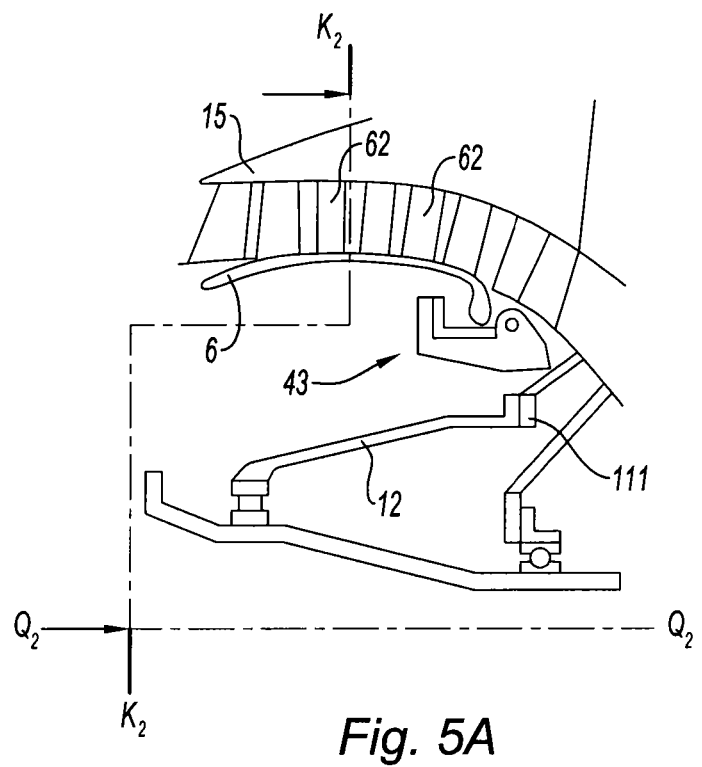
FIG. 5A is a closer view of FIG. 4, wherein the retention means are in the position of use, section planes K2-K2 and Q2-Q2 being shown.
Figure 5B:
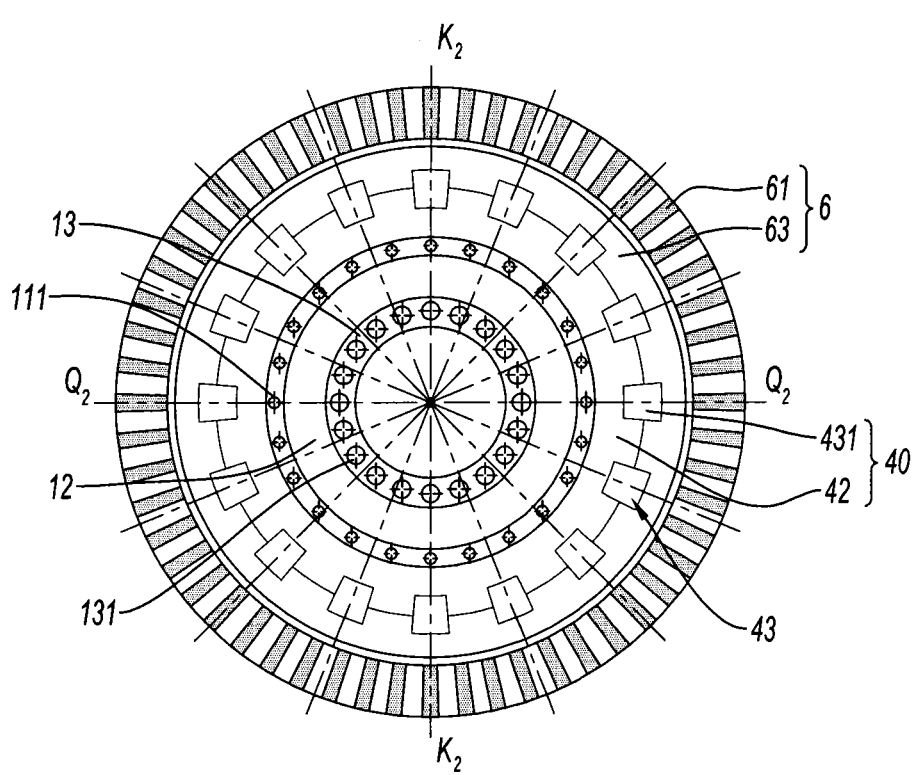
FIG. 5B is a schematic representation, seen from upstream from the retention means according to the second embodiment, according to section planes K2-K2 and Q2-Q2.

According to a second embodiment, in reference to FIGS. 4 and 5, the driving drum 6 has a downstream end 63 forming a solid annular rim 63 extending radially towards the inside of the engine 1. FIG. 5B shows the driving drum 6 with its decoupling device 10 and its retention means 40 seen from the front of the engine. The driving drum 6 has, at its periphery, mobile blades 61 extending radially outwards, the primary and secondary interface elements 12, 13 as well as the divisible connections 111, 131 of the decoupling device 10 being partially shown in FIG. 5B.

The retention means 40 according to this second embodiment of the invention have a solid annular ring 42 extending radially inwards from the fan frame 5 and a plurality of retention dogs 43 which extend radially outwards and are connected with the solid annular ring 42. As shown in FIGS. 4 and 5B by way of illustration, sixteen retention dogs 43 are angularly distributed on the solid annular ring 42 and include each a radial part 431 and a longitudinal part 432 forming a L the downstream end of the longitudinal part 432 of which is connected with the solid annular ring 42 by means of an articulated connection 44, in this instance a swivelling connection 44, as shown in FIG. 4. The radial part 431 of the retention dog 43 which extends radially outwards is parallel to the solid annular ring 42 and shifted upstreamwards with respect to the latter.

The articulated connection 44, formed between each retention dog 43 and the annular ring 42, makes it possible to define a mounting position and a working position. In reference to FIG. 4 showing a retention dog 43 in the mounting position, the latter is mounted so that it can swivel with respect to the ring 42 around an axis extending tangentially to the ring 42 of the engine so as to be able to extend either obliquely inwards, as shown in FIG. 4, or longitudinally in the working position.

Thanks to this articulated connection 44, the driving drum 6 can be easily mounted into the engine downstream from the retention dogs 43 which have been lowered in the mounting position during the insertion of the drum 6 from upstream. Once the driving drum 6 is installed, the retention dogs 43 are lifted back into working position so as to retain axially the drum 6 in the event of breakage of the low-pressure shaft 2 similarly to the first embodiment. In an advantageous way, the control of the positions of the retention dogs 43 is achieved via operating devices 7, such as bevel gears, extending in the forward fairing 15 as shown in FIG. 4. Preferably, these operating devices 7 extend inside the radial arms 59 of the engine 1 between the hub 58 of the fan frame 5 and its outer casing 57. According to a variant, there are as many retention dogs 43 as radial arms 59.

The outer surface of the longitudinal part 432 and the downstream surface of the radial part 431 of the retention dogs 43 are covered with an abradable coating 41 so as to absorb both an axial shock and a radial shock as explained in detail previously.

In working position, the outer end of the radial part 431 of the retention dog 43 is radially exterior to the downstream end 63 of the driving drum 6 so that, in the event of breakage of the low-pressure shaft 2, the driving drum 6 moves axially upstreamwards and the downstream end 63 of the driving drum 6 comes into contact with the radial part 431 of the retention dogs 43, thus preventing ejection of the drum 6 and its fan 4.

Figure 7:
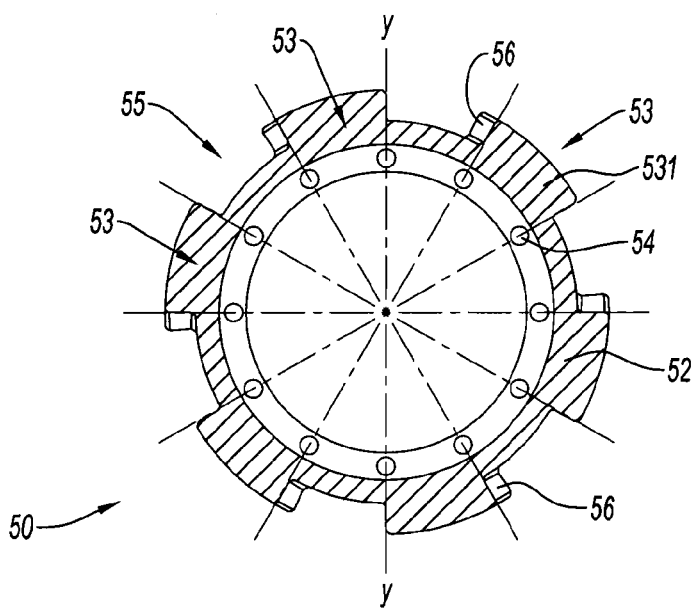
FIG. 7 is a schematic representation, seen from the front of the retention means according to the third embodiment having inclined retention dogs, wherein an axial plane Y-Y is also shown.

According to a third embodiment, in reference to FIGS. 6 and 7, the driving drum 6 has a downstream end 63 forming an annular rim extending radially towards the inside of the engine 1. As shown in FIG. 7, the retention means 50 according to this third embodiment of the invention have an annular ring 52 extending radially inwards from the forward fairing 15 and a plurality of retention dogs 53 which extend radially outwards and are connected with the annular ring 52.

In other words, the retention means 50 include a cylinder 532 extending longitudinally, the downstream end of which is connected with the annular ring 52 by means of a bolted connection 54 and the upstream end of which is connected with a crenellated annular rim extending radially outwards from the upstream end of the longitudinal cylinder 532. This crenellated annular rim includes teeth, forming retention dogs 53, which extend radially outwards and are separated by retention openings 55. As shown in FIG. 7 by way of illustration, six retention dogs 53 are angularly distributed on the solid annular ring 52 and have each a radial part 531 and a longitudinal part 532 forming a L the downstream end of the longitudinal part 532 of which is connected with the solid annular ring 52. The radial part 531 of the retention dog 53 which extends radially outwards is parallel to the solid annular ring 52 and shifted upstreamwards with respect to the latter.

As shown in FIGS. 6 and 7, the outer end of the radial part 531 of the retention dog 53 is radially exterior to the downstream end 63 of the driving drum 6 so that, in the event of breakage of the low-pressure shaft 2, the driving drum 6 moves axially downstreamwards so as its downstream end 63 comes into contact with the radial part 531 of the retention dogs 53, thus preventing ejection of the drum 6 and the fan 4.

The outer surface of the longitudinal cylinder 532 and the downstream surface 531 of the retention dogs 53 are covered with an abradable coating 51 so as to absorb both an axial shock and a radial shock as explained in detail previously.

Figure 8:
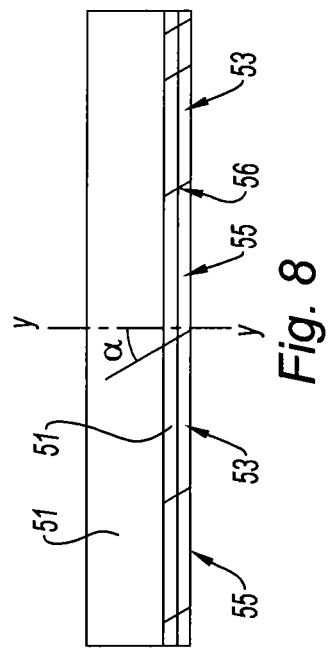
FIG. 8 schematically shows a top view of the inclined retention dogs of FIG. 7, wherein the axial plane Y-Y is also shown.

Referring more particularly to FIG. 8 showing a top view of the retention dogs 53, the latter are inclined so as to enable an easy mounting of the driving drum 6 while enabling a reliable axial retention. In this instance, the lateral surface 56 of a retention dog 53 is inclined with reference to an axial plane Y-Y of the engine 1 passing through the said dog 53 as shown in FIG. 7, the angle formed by the lateral surface 56 and said axial plane Y-Y being designated as the angle of inclination a of the retention dogs 53. In this example, the angle of inclination a of the retention dogs is contained between 10° and 50°.

In reference to FIGS. 7 and 8, the retention dogs 53 are inclined in the anticlockwise direction, when seen from the front, i.e. the downstream part of the retention dogs 53 is angularly shifted in the anticlockwise direction with respect to their upstream part. Preferentially, the clockwise or anticlockwise orientation of the retention dogs 53 is defined according to the direction of rotation of the low-pressure shaft 2 and its driving drum 6. In an advantageous way, the orientation of the retention dogs 53 is the same as the direction of rotation of the low-pressure shaft 2 so as to limit any lack of retention as it is explained in detail thereafter. So, in the case of a low-pressure shaft 2 that rotates in the anticlockwise direction when seen from the front (i.e. in the clockwise direction when seen from behind), the retention dogs 53 are oriented in the anticlockwise direction, when seen from the front.

Figure 9C:
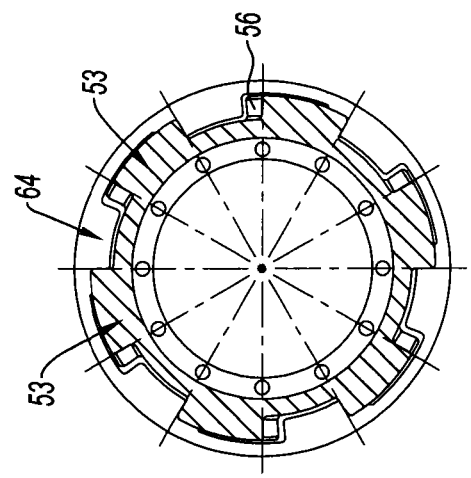
FIG. 9C shows a third angular position of the driving drum with respect to the inclined retention dogs of FIG. 7.
Figure 9B:
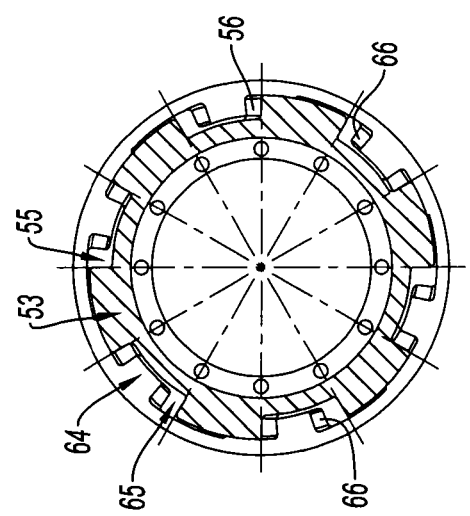
FIG. 9B shows a second angular position of the driving drum with respect to the inclined retention dogs of FIG. 7.
Figure 9A:
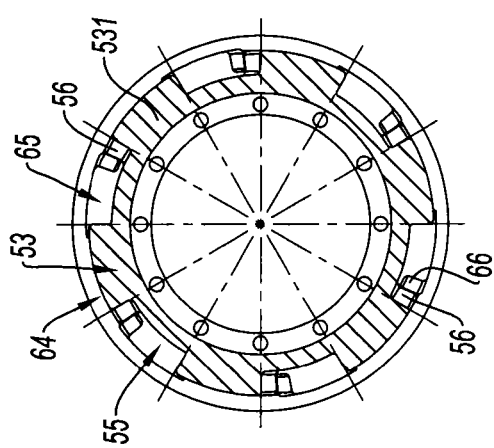
FIG. 9A shows a first angular position of a driving drum of the engine, seen from upstream, with respect to the inclined retention dogs of FIG. 7.

According to this third embodiment, the downstream end 63 has the shape of a crenellated annular rim 63 having stop teeth 64, extending radially inwards, which are separated by stop openings 65 as shown in FIGS. 9A to 9C. In this example, the dimensions of the stop teeth 64 and stop openings 65 are respectively configured so as to correspond to the retention openings 54 and retention dogs 53 while having complementary forms.

Similarly to the retention dogs 53, the stop teeth 64 are inclined. In this instance, the lateral surface 66 of the stop teeth 64 is inclined with reference to the axis of the engine 1. In reference to FIGS. 9A to 9C, the stop teeth 64 are inclined in the anticlockwise direction when seen from the front, i.e. the downstream part of the stop teeth 64 is angularly shifted in the anticlockwise direction, when seen from the front, with respect to their upstream part. In this example, the angle of inclination a of the stop teeth 64 and retention dogs 53 is identical, their respective lateral surfaces 66, 56 being parallel to enable them to cooperate by translation according to a mounting axis which is oblique with reference to the axis X of the engine. The angle formed by the said oblique axis and the axis of the engine corresponds to the angle of inclination a. Any axial translation between the driving drum 6 and the retention means 50 is thus impossible, which ensures the reliability of the axial retention.

Generally, in this instance, the driving shaft 2 is arranged to be rotatively driven in the clockwise direction, when seen from behind, during its operation. To mount the drum 6, the drum 6 is moved downstreamwards into the engine 1 while rotating it in the anticlockwise direction when seen from the front (or clockwise direction when seen from behind), i.e. in the same direction of rotation as the shaft when in use. At the end of the assembling, the stop teeth 64 are placed downstream from the retention dogs 53.

In the event of breakage of the shaft 2 downstream from the fan, the drum 6 moves upstreamwards while continuing to rotate in the anticlockwise direction, when seen from the front, which prevents the cooperation of the retention dogs 53 with the openings 65 of the drum 6.

In other words, the inclination of the stop teeth 64 and retention dogs 53 (anticlockwise direction when seen from the front) is defined with reference to the direction of rotation of the shaft 2 in operation (anticlockwise direction when seen from the front) in order to prevent any lack of retention in the event of breakage of the shaft 2.

In detail, to mount the driving drum 6 into the engine, the drum 6 is axially moved downstreamwards from the front of the engine so that the stop teeth 64 are substantially aligned with the retention openings 55 separating the retention dogs 53. Next the driving drum 6 is obliquely pivoted by the value of the angle of inclination α and then moved downstreamwards so that the stop teeth 64 pass through the retention openings 55 and glide into position downstream from the retention dogs 53. For that purpose, during the downstream movement in the oblique direction, the driving drum 6 is slightly driven into rotation in the anticlockwise direction when seen from the front. Next the driving drum 6 is oriented axially again so that it can be driven by the low-pressure shaft 2. Finally the retention dogs 53 face the convex part of the driving drum 6. According to a variant, the edges of the downstream end 63 of the drum and/or those of the retention means 50 are beamed in order to facilitate the gliding of the stop teeth 64 with the retention openings 55.

In reference to FIGS. 9A, 9B and 9C, during the rotation of the driving drum 6 in the anticlockwise direction, when seen from the front, the retention dogs 53 are on standby inside the drum 6. In the event of breakage of the low-pressure shaft 2, the driving drum 6 moves axially upstreamwards and the retention dogs 53 come and bump against the stop teeth 64.

According to the position shown in FIG. 9A, the retention dogs 53 are aligned with the stop teeth 64, which makes it possible to retain axially the driving drum 6 using all the downstream surface of the retention dogs 53.

According to the position shown in FIG. 9B, the retention dogs 53 are angularly shifted with respect to the stop teeth 64, which makes it possible to retain axially the driving drum 6 using a part of the downstream surface of the retention dogs 53, which is enough to prevent its ejection.

According to the position shown in FIG. 9C, the retention dogs 53 are angularly aligned with the stop openings 65, the inclination of the retention dogs 53 making it possible to retain axially the driving drum 6. Besides, as the driving drum 6 tends to rotate in the same direction as its low-pressure shaft 2 when in the hypercritical mode, the drum 6 is naturally driven in the clockwise direction, which opposes the cooperation of the stop teeth 64 with the retention dogs 53. Ejection of the driving drum 6 downstream from the retention dogs 53 is thus prevented whatever the angular position may be.

In this example, the retention dogs 53 of the drum 6 are equidistant and so are the stop teeth 64. According to a variant, the retention dogs of the drum as well as the stop teeth are dissymmetrical, which makes it possible to limit vibrations associated with the shocks in the hypercritical mode. Indeed, an identical spacing between the retention dogs of the drum generates a vibration the frequency of which is proportional to the number of dogs. With a variable spacing, there is only one shock per revolution, the vibration associated with the shocks is thus reduced.

The invention was described within the framework of embodiments with four, six or sixteen retention dogs but it is obvious that the number of dogs could be different.

The invention claimed is:

1. A gas turbine engine comprising:
    a casing including at least one mounted shaft for driving a fan;
    a driving drum solidly connected to the fan and including blades to compress an airflow moving from upstream to downstream in the engine; and
    an axial retention device, on standby, solidly connected to the casing and configured to come into contact with the driving drum so as to prevent axial movement of the driving drum in event of breakage of the driving shaft.

2. An engine according to claim 1, wherein the driving drum includes stop means configured to come into contact with the axial retention device.

3. An engine according to claim 2, wherein the stop means extends radially towards an inside of the engine.

4. An engine according to claim 2, wherein the stop means are formed by a downstream part of the driving drum, or a downstream end of the driving drum.

5. An engine according to claim 4, wherein the stop means extend radially towards an inside of the engine.

6. An engine according to one of claim 1, wherein the axial retention device, on standby, extends into the driving drum.

7. An engine according to claim 6, wherein the driving drum includes a radially convex part, and
    wherein the axial retention device, on standby, faces the radially convex part.

8. An engine according to claim 1, wherein the axial retention device includes at least one retention dog longitudinally aligned with a downstream part of the driving drum so as to prevent the axial movement of the driving drum in the event of breakage of the driving shaft.

9. An engine according to claim 1, wherein the axial retention device includes an abradable coating configured to come into contact with the driving drum.

10. An engine according to claim 8, wherein the retention dog is articulated with respect to the casing so as to define:
    a mounting position in which the retention dog is radially shifted with respect to the driving drum so as to enable an axial movement of the driving drum; and
    a working position in which the retention dog is longitudinally aligned with the driving drum so as to prevent the axial movement of the driving drum in the event of breakage of the driving shaft.

11. An engine according to claim 8, wherein the axial retention device comprises a crenellated annular retention ring extending radially outwards and including retention dogs separated by retention openings,
    wherein the driving drum comprises a crenellated annular stop ring extending radially inwards and including stop teeth separated by stop openings, and
    wherein the stop teeth arranged to come into contact with the retention dogs so as to prevent the axial movement of the driving drum in the event of breakage of the driving shaft.

12. An engine according to claim 11, wherein at least one retention dog is inclined with reference to an axial plane crossing the retention dog.

13. A gas turbine engine comprising:
    a casing including at least one mounted shaft for driving a fan;
    a driving drum solidly connected to the fan and including blades to compress an airflow moving from upstream to downstream in the engine; and
    an axial retention device, on standby, solidly connected to the casing and configured to come into contact with the driving drum so as to prevent axial movement of the driving drum in event of breakage of the driving shaft,
    wherein a downstream end of the driving drum extends radially inwards,
    wherein the axial retention device includes a retention dog having a longitudinal portion and a radial portion extending from an upstream end of the longitudinal portion, and
    wherein, in the event of breakage of the driving shaft, the downstream end of the driving drum abuts a downstream face of the radial portion of the retention dog.

14. An engine according to claim 13, wherein the radial portion of the retention dog extends radially outwards.

* * * * *